United States Patent
Li et al.

(10) Patent No.: US 12,094,193 B2
(45) Date of Patent: Sep. 17, 2024

(54) IMAGE PROCESSING METHOD AND IMAGE PROCESSING DEVICE

(71) Applicant: BOE Technology Group Co., Ltd., Beijing (CN)

(72) Inventors: Yingying Li, Beijing (CN); Zhenglong Li, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 488 days.

(21) Appl. No.: 17/463,898

(22) Filed: Sep. 1, 2021

(65) Prior Publication Data

US 2021/0398287 A1    Dec. 23, 2021

Related U.S. Application Data

(63) Continuation of application No. 15/974,926, filed on May 9, 2018, now Pat. No. 11,138,738.

(30) Foreign Application Priority Data

Oct. 31, 2017    (CN) .......................... 201711052903.4

(51) Int. Cl.
*G06V 10/82* (2022.01)
*G06F 18/2413* (2023.01)
*G06N 3/02* (2006.01)
*G06T 7/00* (2017.01)
*G06T 7/11* (2017.01)
(Continued)

(52) U.S. Cl.
CPC .......... *G06V 10/82* (2022.01); *G06F 18/2413* (2023.01); *G06N 3/02* (2013.01); *G06T 7/0002* (2013.01); *G06T 7/11* (2017.01); *G06V 10/40* (2022.01); *G06V 10/764* (2022.01); *G06F 2218/08* (2023.01);
(Continued)

(58) Field of Classification Search
None
See application file for complete search history.

(56) References Cited

U.S. PATENT DOCUMENTS 9,275,307 B2    3/2016    Chattopadhyay et al.
9,811,886 B2    11/2017    Jeon et al.
(Continued)

FOREIGN PATENT DOCUMENTS

CN    103034872 A    4/2013
CN    104112113 A    10/2014
(Continued)

OTHER PUBLICATIONS

First Office Action, including Search Report, for Chinese Patent Application No. 201711052903.4, dated Feb. 3, 2020, 18 pages.
(Continued)

*Primary Examiner* — Samir A Ahmed
(74) *Attorney, Agent, or Firm* — Westman, Champlin & Koehler, P.A.

(57) ABSTRACT

The embodiments of the present disclosure disclose an image processing method and device. The image processing method comprises transforming a first image to obtain a plurality of second images; obtaining feature maps of each of the second images by performing feature extraction on the second images using a first machine learning unit selected from a group including at least one first machine learning unit; and inputting the feature maps of each of the second images to a second machine learning unit to obtain a processing result of the first image.

14 Claims, 3 Drawing Sheets

(51) Int. Cl.
*G06V 10/40* (2022.01)
*G06V 10/764* (2022.01)
*G06V 10/44* (2022.01)

(52) U.S. Cl.
CPC .............. *G06T 2207/20076* (2013.01); *G06T 2207/20081* (2013.01); *G06V 10/454* (2022.01); *G06V 2201/03* (2022.01)

(56) References Cited

U.S. PATENT DOCUMENTS

| | | | |
|---|---|---|---|
| 2014/0348420 | A1 | 11/2014 | Chattopadhyay et al. |
| 2016/0209995 | A1 | 7/2016 | Jeon et al. |
| 2018/0295375 | A1 | 10/2018 | Ratner |
| 2019/0114804 | A1 | 4/2019 | Sundaresan et al. |
| 2020/0051211 | A1 | 2/2020 | Shiokawa et al. |
| 2020/0082165 | A1 | 3/2020 | Wang et al. |

FOREIGN PATENT DOCUMENTS

| | | |
|---|---|---|
| CN | 104182770 A | 12/2014 |
| CN | 105488515 A | 4/2016 |
| CN | 105488534 A | 4/2016 |
| CN | 105825235 A | 8/2016 |
| CN | 106097335 A | 11/2016 |
| CN | 106155327 A | 11/2016 |

OTHER PUBLICATIONS

Second Office Action, including Search Report, for Chinese Patent Application No. 201711052903.4, dated Aug. 24, 2020, 17 pages.
Notice of Allowance and Fee (s) Due and Examiner Initiated Interview Summary for U.S. Appl. No. 15/974,926, mailed Jun. 2, 2021, 12 pages.
Non-Final Rejection for U.S. Appl. No. 15/974,926, mailed Feb. 9, 2021, 7 pages.
Advisory Action for U.S. Appl. No. 15/974,926, mailed Dec. 11, 2020, 2 pages.
Applicant Initiated Interview Summary for U.S. Appl. No. 15/974,926, mailed Dec. 7, 2020, 3 pages.
Final Rejection for U.S. Appl. No. 15/974,926, mailed Oct. 5, 2020, 7 pages.
Non-Final Rejection for U.S. Appl. No. 15/974,926, mailed Apr. 30, 2020, 9 pages.
Requirement for Restriction-Election for U.S. Appl. No. 15/974,926, mailed Feb. 10, 2020, 5 pages.

IMAGE PROCESSING METHOD AND IMAGE PROCESSING DEVICE

CROSS-REFERENCE TO RELATED APPLICATION(S)

This application is a continuation application of U.S. application Ser. No. 15/974,926, filed on May 9, 2018, which published as U.S. Publication No. 2019/0130574 A1, on May 2, 2019, which claims priority to Chinese Patent Application No. 201711052903.4, filed on Oct. 31, 2017, the contents of which are incorporated herein by reference in their entireties.

TECHNICAL FIELD

The present disclosure relates to an image processing method and an image processing device.

BACKGROUND

Image processing technology has a wide range of applications in many fields such as geodetic images, remote sensing and medical images etc. Therefore, how to quickly and accurately complete the processing of image data has always been one of the hot spots in the computer field.

With the development of machine learning technology, more and more machine learning models and algorithms are introduced into the image processing technology. At present, the commonly used image processing models are mostly single models and have simple structures, and therefore there is a problem that the image recognition processing has insufficient accuracy and poor robustness.

SUMMARY

According to a first aspect of the present disclosure, there is provided an image processing method, comprising:
transforming a first image to obtain a plurality of second images;
obtaining feature maps of each of the second images by performing feature extraction on the plurality of second images using a first machine learning unit selected from a group including at least one first machine learning unit; and
inputting the feature maps of each of the second images to a second machine learning unit to obtain a processing result of the first image.

In some embodiments, obtaining feature maps of each of the second images comprises:
selecting one first machine learning unit from the group including at least one first machine learning unit, to perform feature extraction on each of the second images.

In some embodiments, obtaining feature maps of each of the second images comprises:
selecting a plurality of first machine learning units from the group including at least one first machine learning unit, to perform feature extraction on at least part of the second images in one-to-one correspondence.

In some embodiments, obtaining feature maps of each of the second images comprises: outputting feature maps having the same resolution of each of the second images.

In some embodiments, the first machine learning unit comprises a first neural network, and the feature maps having the same resolution of each of the second images are output through at least one intermediate layer of the first neural network of the selected first machine learning unit.

In some embodiments, the second machine learning unit comprises a second neural network.

In some embodiments, transforming a first image to obtain a plurality of second images comprises:
processing the first image according to a transformation rule to obtain the plurality of second images,
wherein the transformation rule comprises at least one of spatial domain transformation, value domain transformation, or time domain transformation.

In some embodiments, the first image comprises a medical image, and transforming the first image comprises performing transformation without changing pathological properties of the medical image.

In some embodiments, the processing result of the first image comprises classifying or clustering for the first image.

In some embodiments, the method further comprises: training the first machine learning unit using a first sample image to generate parameters of the first machine learning unit, wherein the first sample image comprises at least part of the plurality of second images.

In some embodiments, the method further comprises: training the second machine learning unit using a second sample image to generate parameters of the second machine learning unit, wherein the second sample image comprises at least part of feature maps corresponding to the plurality of second images.

According to another aspect of the present disclosure, there is provided an image processing device, comprising:
one or more processors;
one or more memories connected to the one or more processors and having instructions stored thereon which, when executed on the one or more processors, cause the one or more processors to be configured to:
transform a first image to obtain a plurality of second images;
obtain feature maps of each of the second images by performing feature extraction on the second images using a first machine learning unit selected from a group including at least one first machine learning unit; and
input the feature maps of each of the second images to a second machine learning unit to obtain a processing result of the first image.

In some embodiments, the one or more processors are further configured to select one first machine learning unit, to extract feature maps of each of the second images.

In some embodiments, the one or more processors are further configured to select a plurality of first machine learning units, to perform feature extraction on at least part of the second images in one-to-one correspondence.

In some embodiments, the one or more processors are further configured to obtain feature maps having the same resolution of each of the second images.

In some embodiments, the first machine learning unit comprises a first neural network.

In some embodiments, the second machine learning unit comprises a second neural network.

In some embodiments, the one or more processors are further configured to process the first image according to a transformation rule to obtain the plurality of second images,
wherein the transformation rule comprises at least one of spatial domain transformation, value domain transformation, or time domain transformation.

In some embodiments, the first image comprises a medical image, and transforming the first image comprises performing transformation without changing pathological properties of the medical image.

In some embodiments, the processing result of the first image comprises classifying or clustering for the first image.

BRIEF DESCRIPTION OF THE DRAWINGS

Other features, objects and advantages of the present disclosure will become more apparent by reading the detailed description of non-limiting embodiments made with reference to the following drawings in which.

DETAILED DESCRIPTION

The present disclosure will be further described in detail below with reference to the drawings and embodiments. It should be understood that the specific embodiments described herein are merely used for explaining the present disclosure, rather than limiting the present disclosure. In addition, it should also be noted that, for the convenience of description, only the part related to the present disclosure is shown in the drawings.

It should be noted that, in the case of no conflict, the embodiments in the present disclosure and the features in the embodiments may be combined with each other randomly. The present disclosure will be described in detail below with reference to the drawings and in combination with embodiments.

Unless otherwise defined, technical or scientific terms used in the present disclosure have the same meaning as commonly understood by one of ordinary skill in the art to which this application belongs. Words "first," "second," and similar terms used in the present disclosure do not denote any order, number, or importance but merely distinguish between different components. Likewise, words such as "include" or "comprise" etc. mean that the element or article preceding the word covers elements or items that appear after the word and their equivalents, but do not exclude other elements or items. Words "connected to" or "connected with" etc. are not limited to physical or mechanical connections but may include electrical or signal connections, regardless of direct or indirect connection.

In the embodiments described below, communication connections include connections over any of a wireless network, a wired network, and/or any combination of a wireless network and a wired network. The network may include a local area network, the Internet, a telecommunications network, Internet of Things based on the Internet and/or the telecommunications network, and/or any combination of the above networks, etc. For example, the wired network may use metal traces, twisted pair cables, coaxial cables or optical fibers etc. to transmit information. For example, the wireless network may use a WWAN mobile communication network, Bluetooth, Zigbee or Wi-Fi and other communication methods.

In the embodiments described below, the processor is a processing device having logic operations, such as a Central Processing Unit (CPU), a Field Programmable Logic Array (FPGA), a Digital Signal Processor (DSP), a single chip Microcomputer (MCU), an Application Specific Integrated Circuit (ASIC), a Graphic Processing Unit (GPU), and other devices with data processing capabilities and/or program execution capabilities. It will be readily understood that the processor is typically communicatively coupled to a memory to store any combination of one or more computer program products on the memory. The memory may include various forms of computer-readable storage media, such as a volatile memory and/or a non-volatile Memory. The volatile memory may include, for example, a Random Access Memory (RAM) and/or a cache etc. and the non-volatile memory may include, for example, a Read Only Memory (ROM), a hard disk, an Erasable Programmable Read Only Memory (EPROM), a USB memory, a flash memory, etc. One or more computer instructions may be stored on the memory, and the processor may execute the computer instructions to implement associated analysis functions. Various application programs and various data, such as various data used and/or generated by the application programs, may also be stored in the computer-readable storage medium.

In the embodiments described below, each unit may be implemented by a processor executing related computer instructions. For example, an image transformation unit may be implemented by a processor executing instructions of an image transformation algorithm, a machine learning unit may be implemented by a processor executing instructions of a machine learning algorithm, and a neural network may be implemented by a processor executing instructions of a neural network algorithm.

In the embodiments described below, various units may run on the same processor or multiple processors; various units may run on processors with the same architecture, for example, all of the units run on processors with the X86 system, or may also run on processors with different architectures, for example, the image transformation unit runs on a CPU with the X86 system, first and second machine learning units run on the GPU. Each unit may be packaged in a computer product, for example, various units are packaged in single computer software and run on a computer (server), or may be individually or partially packaged in different computer products, for example, the image transformation unit is packaged in single computer software and runs on a computer (server), the first and second machine learning units are respectively encapsulated in separate computer software and run on other one or more computers (servers). A computing platform when performed by each unit may be local computing, or cloud computing, or a combination of local computing and cloud computing.

In the embodiments described below, machine learning (such as neural network) may be implemented by using an existing machine learning (for example, neural network) framework preset with parameters, or a machine learning framework which obtain required parameters by training related image samples according to the embodiments of the present disclosure using the existing machine learning (for example, neural network) framework. The machine learning (for example, neural network) framework may also be built and trained according to the essence of the embodiments of the present disclosure. Parameters of machine learning (for example, neural network) applicable to other image processing may be migrated to the machine learning (for example, neural network) framework according to the embodiments of the present disclosure by means of migration learning.

Figure 1:
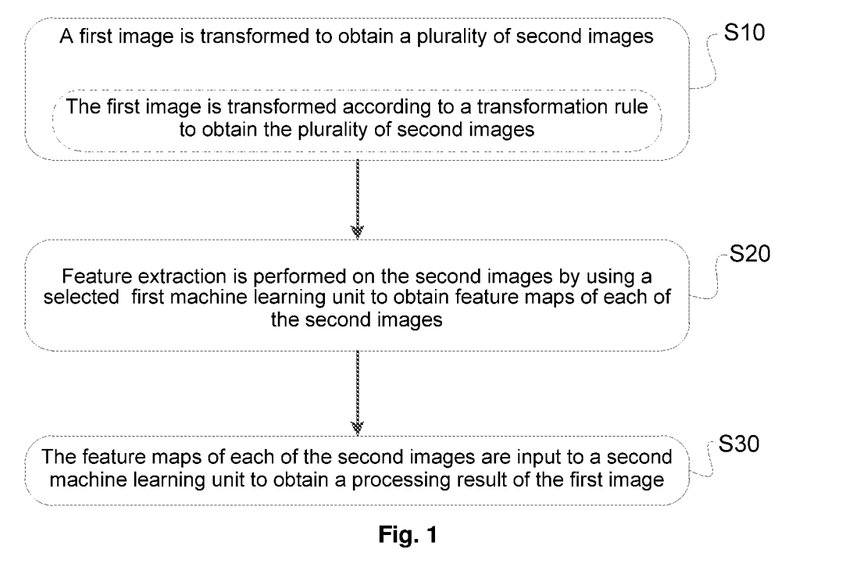
FIG. 1 shows an exemplary flowchart of an image processing method according to an embodiment of the present disclosure.

FIG. 1 shows an exemplary flowchart of an image processing method according to an embodiment of the present disclosure.

As shown in FIG. 1, the image processing method according the embodiment of the present disclosure comprises the following steps.

In step S10, a first image is transformed to obtain a plurality of second images.

In the embodiment of the present disclosure, a plurality of second images may be obtained by transforming the first image. The transformation process may use different transformation methods according to different information contained in the first image, or may use different transformation methods according to different features to be extracted.

In the embodiment, step S10 comprises: transforming the first image according to a transformation rule to obtain the plurality of second images.

In the embodiment of the present disclosure, the transformation rule may be different according to a feature of the first image, or may be different according to a feature to be extracted. The first image may be processed according to one or more transformation rules.

Alternatively, the transformation rule comprises at least one of spatial domain transformation, value domain transformation, or time domain transformation, and transformation recommended in the field of expertise related to the first image may also be selected based on the above transformation rule.

The spatial domain transformation is, for example, rotation, flipping, translation, stretching, twisting, deforming, scaling etc. of an image. The value domain transformation is, for example, image filtering, image segmentation, image occlusion, image compression, chroma mapping, colorization, graying etc. The time domain transformation is, for example, autocorrelation function transformation, cross-correlation function transformation etc.

Alternatively, when the first image is an image with a specific application or property, the transformation is performed using the transformation recommended in the field of expertise related to the first image in order not to affect the underlying intrinsic features contained in the first image.

For example, the first image is a medical image, the transformation may be performed using transformation that does not change the pathological properties of the medical image, including the spatial transformation usually employed in medical image transformation such as rotation, flipping, translation, stretching, twisting, deforming, scaling etc. of the image, and color transformation, such as graying, binarization etc. of the image.

Alternatively, when the first image is transformed, a plurality of second images may be obtained based on a single transformation rule, or a plurality of second images may also be obtained based on a plurality of transformation rules.

For example, by taking a dermoscope image of melanoma as an example, one image may be transformed to obtain five second images in different degrees of rotation. Alternatively, one image may be transformed to obtain five second images, wherein three second images are obtained by rotation, and two second images are obtained by a color constancy theory. Alternatively, one image may be transformed to obtain five second images, all of which are obtained by both rotation and the color constancy theory.

In the embodiments described above, the first image is transformed, which increases an amount of image data without affecting effective information of the image, thereby facilitating improving the accuracy of image processing and recognition.

In step S20, feature extraction is performed on the second images by using a first machine learning unit selected from a group of at least one first machine learning unit to obtain a plurality of feature maps of each of the second images.

In the embodiment of the present disclosure, the first machine learning unit may be implemented by any available feature extraction algorithm in the field of machine learning, such as principal component analysis, Fisher linearity recognition, projection tracking, neural network, genetic algorithm, etc. The features to be extracted may be various features included in the image, for example, including but not limited to colors, grayscales, textures, outlines, areas, special points, lines and any combination of these features etc.

In the embodiments described above, the feature extraction is performed by selecting a suitable first machine learning unit according to requirements, which can effectively remove useless features and noise interferences in the first image and prevent different second images from interfering with each other during feature extraction, so as to retain the essential features of the first image in each of the second images, thereby improving the accuracy and adaptability of the image processing.

In the embodiment, the first machine learning unit comprises a first neural network.

In some embodiments of the present disclosure, various first neural networks in the group including at least one first machine learning unit are the same, and related training may be performed in advance according to a training process of a general neural network to obtain different parameters, and a first neural network with the best performance is selected for feature extraction.

In some embodiments of the present disclosure, first neural networks of at least part of the first machine learning units in the group including at least one first machine learning unit are different. For example, the first neural networks have the same architecture but different parameters, or for example, the first neural networks have different architectures. Related training may be performed in advance according to the training process of the general neural network, and one or more first neural networks with the best performance are selected for feature extraction. When features of each of the second images are extracted, one neural network is selected randomly from the one or more first neural networks with the best performance for feature extraction.

In some embodiments of the present disclosure, in the group including at least one first machine learning unit, first neural networks of at least part of the first machine learning units are neural networks at least suitable for performing feature extraction on a part of the second images, which are selected from neural networks existing in the art by a person skilled in the art for a type of the second images obtained by transformation. Feature extraction is performed on the second images in one-to-one correspondence using these first neural networks. Alternatively, a plurality of first neural networks with different architectures are trained, and a part of the trained first neural networks are selected to perform feature extraction on at least part of the second images in one-to-one correspondence. Alternatively, a plurality of first neural networks with the same architecture are trained, and a part of the trained first neural networks with different parameters are selected to perform feature extraction on at least part of the second images in one-to-one correspondence.

The first neural network may use various common neural network architectures such as a Convolutional Neural Network (CNN), a Deep Neural Network (DNN), a Recurrent Neural Network (RNN), an Auto-Encoder Neural Network (AENN), a Sparse Autoencoder (SAE) etc., or neural network products such as AlexNet, VGGNet, Google Inception Net, ResNet, etc., which are implemented by the common neural network architectures. Alternatively, a structure of the neural network may also be designed according to the principle of neural networks.

In step S30, the plurality of feature maps of each of the second images are input to a second machine learning unit to obtain a processing result of the first image.

In the embodiment of the present disclosure, all feature maps of the second images obtained in step S20 are input to the second machine learning unit for processing, and the processing may be one or more image processing processes such as image analysis, segmentation, recognition, classification, clustering, super-resolution enhancement, retrieval, etc.

In some embodiments of the present disclosure, the image processing method is to classify or cluster the first image.

In the embodiment of the present disclosure, the second machine learning unit may be any algorithm for processing the feature maps, such as support vector machine, simple fusion, collaborative training fusion, neural network, etc.

In some embodiments of the present disclosure, the second machine learning unit comprises a second neural network. The second neural network may use various common neural network architectures such as a Convolutional Neural Network (CNN), a Deep Neural Network (DNN), a Recurrent Neural Network (RNN), an Auto-Encoder Neural Network (AENN), a Sparse Autoencoder (SAE) etc., or neural network products such as AlexNet, VGGNet, Google Inception Net, ResNet, etc., which are implemented by the common neural network architectures. Alternatively, a structure of the neural network may also be designed according to the principle of neural networks.

It can be easily understood by those skilled in the art that the second neural network has a corresponding structure thereof to adapt to the requirements of image processing purposes. For example, when the image processing is to classify/cluster an image, a classifier is provided in an output layer of the second neural network; and when the image processing is to enhance a resolution of the image, a deconvolutional layer is provided in the second neural network.

In the embodiments described above, the feature maps are extracted by inputting each of the second images obtained by transformation to the first machine learning unit, and the extracted feature maps are input to the second machine learning unit for processing, thereby greatly improving the accuracy and robustness of image processing.

Figure 2:
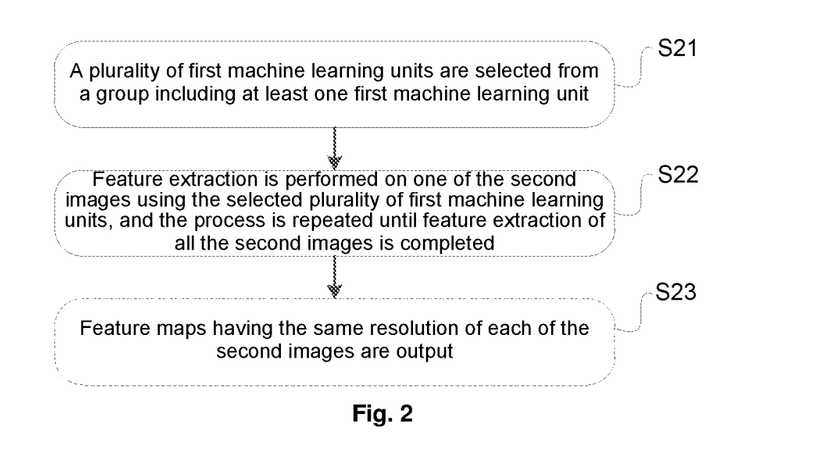
FIG. 2 shows an exemplary flowchart of a feature extraction process of a second image in an image processing method according to at least one embodiment of the present disclosure.

FIG. 2 shows an exemplary flowchart of a feature extraction process of a second image in an image processing method according to at least one embodiment of the present disclosure.

As shown in FIG. 2, in at least one embodiment, step S20 comprises the following steps.

In step S21, a plurality of first machine learning units are selected from a group including at least one first machine learning unit.

In some embodiments of the present disclosure, related training is performed on each of the first machine learning units in advance according to a training process of general machine learning, and a plurality of first machine learning units with better performance are selected as candidates required for feature extraction. The performance effect may be measured according to the performance of the machine learning unit on a test set. The plurality of first machine learning units may be, for example, randomly selected, or may be, for example, selected in combination with experience of those skilled in the art.

In some embodiments of the present disclosure, the first machine learning unit is trained using at least part of the plurality of second images as a first sample image training set to form parameters of the first machine learning unit. For example, a plurality of second sample images are formed using a plurality of different first images according to each corresponding transformation, and the first machine learning unit is trained using the plurality of second sample images formed by each transformation as the first sample image training set, so as to form parameters (for example, model parameters) of the first machine learning unit corresponding to the transformation, and so on. As a result, the parameters of the first machine learning unit corresponding to a selected transformation manner are formed.

In step S22, feature extraction is performed on one of the second images using the selected plurality of first machine learning units, and the process is repeated until feature extraction of all the second images is completed.

For each of the plurality of second images, feature extraction may be performed using the selected first machine learning units described above. Feature extraction may be performed on each of the second images using the same first machine learning unit, or feature extraction may also be performed on each of the second images using different first machine learning units.

The different first machine learning units referred to here may have the same architecture but different design parameters, or may have different architectures.

That is, a first machine learning unit which has been trained and is effective may be selected to perform feature extraction on each of the second images, or a first machine learning unit which is suitable for a part of the second images may also be selected for feature extraction on the part of second images, or a corresponding first machine learning unit may also be selected for each of the second images for feature extraction on the second image.

In some embodiments of the present disclosure, for each of the second images obtained by transforming the first image, a first machine learning unit which is suitable for a corresponding transformation rule is selected to extract features of the corresponding second image to improve the accuracy of processing. For example, for a second image generated based on transformation such as graying, a first machine learning unit based on a CNN is used for feature extraction; for a second image generated based on transformation such as stretching, twisting etc., a first machine learning unit based on a DNN is used for feature extraction; and for a second image generated by transformation such as random image noise adding etc., a first machine learning unit based on a Denoising Autoencoder (DAE) is used for feature extraction.

In some embodiments of the present disclosure, step S20 further comprises step S23, in which feature maps having the same resolution of each of the second images are output. For example, by taking the first machine learning unit being implemented by the first neural network as an example, the feature maps having the same resolution of each of the second images are output through at least one intermediate layer of the first neural network of the selected first machine learning unit.

With such a method, the pressure when image processing is performed by the second machine learning unit is effectively reduced.

For example, for a dermascope image, an Inception v3 neural network may be selected according to image features of the dermascope image to perform feature extraction on five second images obtained by transforming the dermascope image through the Inception v3 neural network. Each of the second images is input to an Inception v3 model. As an intermediate layer of the model can extract not only 768 17*17 feature maps, but also 1280 8*8 feature maps, according to the features of the dermascope image needed to be extracted, feature maps are selected, for example, 1280 feature maps with a resolution of 8*8 are selected to be extracted and a total of 5*1280 feature maps are extracted.

For example, for the five second images obtained by transforming the dermascope image, feature extraction is performed on second images which are grayed and binarized through the Inception v3 neural network, and feature extraction is performed on second images which are rotated, stretched and flipped through an Inception-ResNet-v2 neural network. Different intermediate layers of the two neural networks are selected respectively to output 768 17*17 feature maps, and a total of 5*768 feature maps are extracted.

It can be understood by those skilled in the art that, based on the rapid development of the deep learning neural network and the rapid growth of the hardware computing capability, feature maps of a part of the second images with different resolutions may also be selected to be output, for example, a resolution of a part of the feature maps is 8*8, a resolution of a part of the feature maps is 16*16, and a resolution of a part of the feature maps is 32*32.

In the embodiments described above, the feature maps are extracted by the first machine learning unit, for example, the first neural network, which greatly improves the robustness and fault tolerance of the image processing process. At the same time, a suitable first machine learning unit is selected according to the requirements to filter and extract the feature maps, which effectively optimizes the speed, accuracy, and stability of image processing.

Figure 3:
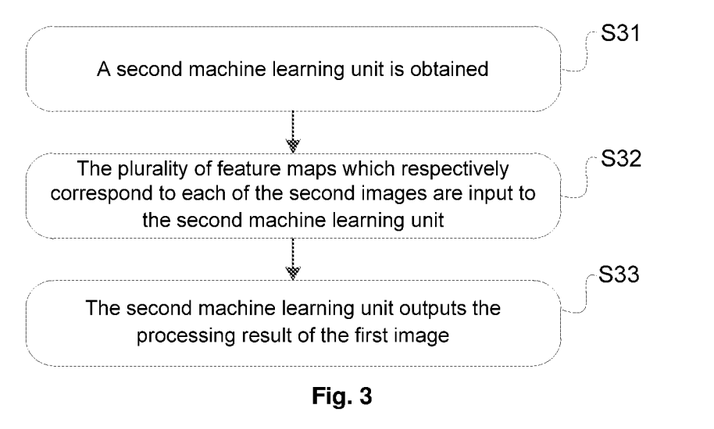
FIG. 3 shows an exemplary flowchart of an image processing process performed by a second machine learning unit in an image processing method according to at least one embodiment of the present disclosure.

FIG. 3 shows an exemplary flowchart of an image processing process performed by a second machine learning unit in an image processing method according to an embodiment of the present disclosure.

As shown in FIG. 3, in some embodiments of the present disclosure, step S30 comprises the following steps.

In step S31, a second machine learning unit is obtained.

For example, an existing neural network may be selected or a new neural network may be generated by training as the second machine learning unit.

In some embodiments of the present disclosure, the second machine learning unit may be the same as or different from a certain first machine learning unit in the group including at least one first machine learning unit, and a specific network structure may be pre-built and trained according to specific requirements.

In some embodiments of the present disclosure, the second machine learning unit is trained using at least part of the feature maps of the plurality of second images extracted by the first image learning unit as a second sample image training set to form parameters of the second machine learning unit. For example, a plurality of second sample images are formed using a plurality of different first images according to each corresponding transformation, and the second machine learning unit is trained using feature maps of the plurality of second sample images formed by various transformation, which are extracted by the first machine learning unit, so as to form parameters (for example, model parameters) of the second machine learning unit.

For example, by taking the second machine learning unit being the second neural network as an example, a structure of the second neural network may be designed as a convolutional layer-a fully connected layer—an LR classifier to classify the first image, or may also be designed as a convolutional layer—a pooling layer—a fully connected layer—an SVM classifier to classify the first image, or may also be designed as a convolutional layer—a pooling layer—K-means clustering to cluster the first image, or may also be designed as a convolutional layer-a fully connected layer-a deconvolutional layer to enhance a resolution of the first image, and so on. The structure of the second neural network may be specifically designed according to the requirements of the image processing purposes.

In step S32, the plurality of feature maps of each of the second images are input to the second machine learning unit.

An object processed by the second machine learning unit is all the feature maps obtained in step S20, and pixels, sizes, or numbers of the feature maps may be the same or different.

In step S33, the second machine learning unit outputs the processing result of the first image.

The second machine learning unit may process all the feature maps by merging them together to obtain and output the final processing result.

In the embodiments described above, all the plurality of feature maps are input to the second machine learning unit for processing, which enhances the accuracy and robustness of the image processing.

Figure 4:
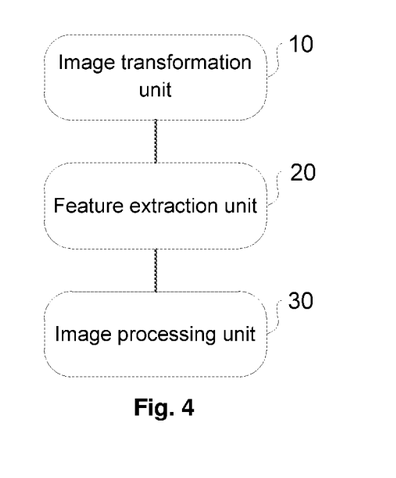
FIG. 4 shows a schematic structural diagram of an image processing apparatus according to at least one embodiment of the present disclosure.

FIG. 4 shows a schematic structural diagram of an image processing apparatus according to at least one embodiment of the present disclosure.

As shown in FIG. 4, the image processing apparatus comprises an image transformation unit 10, a feature extraction unit 20, and an image processing unit 30.

The image transformation unit 10 is configured to transform a first image to obtain a plurality of second images.

In the embodiment of the present disclosure, the first image may be transformed by the image transformation unit 10 to obtain a plurality of second images. The transformation process may use different transformation methods according to different information contained in the first image, or may use different transformation methods according to different features to be extracted.

In some embodiments of the present disclosure, the image transformation unit 10 is configured to process the first image according to a transformation rule to obtain the plurality of second images.

In some embodiments of the present disclosure, the transformation rule of the image transformation unit 10 may be different according to a feature of the first image, or may also be different according to a feature to be extracted. The first image may be processed according to one or more transformation rules.

For example, for a dermoscope image of melanoma, one image may be transformed to obtain five second images only by transformation such as rotation. Alternatively, one image may also be transformed to obtain five second images, wherein three second images are obtained by rotation, and two second images are obtained by a color constancy theory.

Alternatively, one image may also be transformed to obtain five second images by both rotation and the color constancy theory.

Alternatively, the transformation rule comprises spatial domain transformation, value domain transformation, or time domain transformation, and transformation recommended in the field of expertise related to the first image may also be selected based on the above transformation rule.

The spatial domain transformation is, for example, rotation, flipping, translation, stretching, twisting, deforming, scaling etc. of an image. The value domain transformation is, for example, image filtering, image segmentation, image occlusion, image compression, chroma mapping, colorization, graying etc. The time domain transformation is, for example, autocorrelation function transformation, cross-correlation function transformation etc.

Alternatively, when the first image is an image with a specific application or property, the transformation is performed using the transformation recommended in the field of expertise related to the first image in order not to affect the underlying intrinsic features contained in the first image.

For example, if the first image is a medical image, the transformation may be performed using transformation that does not change the pathological properties of the medical image, including the spatial transformation usually employed in medical image transformation such as rotation, flipping, translation, stretching, twisting, deforming, scaling etc. of the image, and color transformation, such as graying, binarization etc. of the image.

For example, for a dermoscopic image of melanoma, under the guidance of a doctor, the image transformation unit 10 may transform one original dermoscopic image into five second images by rotating and flipping the dermoscopic image.

In the embodiments described above, the first image is transformed by the image transformation unit, which increases an amount of image data without affecting effective information of the image, thereby facilitating improving the accuracy of image processing and recognition.

The feature extraction unit 20 is configured to perform feature extraction on the second images by using a first machine learning unit selected from a group including at least one first machine learning unit to obtain feature maps of each of the second images.

In the embodiment of the present disclosure, the first machine learning unit may be implemented by any available feature extraction algorithm in the field of machine learning, for example, including but not limited to principal component analysis, Fisher linearity recognition, projection tracking, neural network, genetic algorithm, etc. The features to be extracted may be various features included in the image, for example, including but not limited to colors, grayscales, textures, outlines, areas, special points, lines and any combination of these features etc.

In the embodiments described above, the feature extraction is performed by selecting a suitable first machine learning unit according to requirements, which can effectively remove useless features and noise interferences in the first image and prevent different second images from interfering with each other during feature extraction, so as to retain the essential features of the first image in each of the second images, thereby improving the accuracy and adaptability of the image processing.

In the embodiment, the first machine learning unit comprises a first neural network.

In some embodiments of the present disclosure, various first neural networks are the same, and related training may be performed in advance according to a training process of a general neural network to obtain different parameters, and a first neural network with the best performance is selected for feature extraction.

In some embodiments of the present disclosure, at least part of the first neural networks are different. For example, the first neural networks may have the same architecture but different parameters, or for example, the first neural networks may have different architectures. Related training may be performed in advance according to the training process of the general neural network, and one or more first neural networks with the best performance are selected for feature extraction. When features of each of the second images are extracted, one neural network is selected randomly from the one or more first neural networks with the best performance for feature extraction.

In some embodiments of the present disclosure, at least part of the first neural networks are neural networks at least suitable for performing feature extraction on a part of the second images, which are selected from neural networks existing in the art by a person skilled in the art for a type of the second images obtained by transformation. Feature extraction is performed on the second images in one-to-one correspondence using these first neural networks. Alternatively, a plurality of first neural networks with different architectures are trained, and a part of the trained first neural networks are selected to perform feature extraction on at least part of the second images in one-to-one correspondence. Alternatively, a plurality of first neural networks with the same architecture are trained, and a part of the trained first neural networks with different parameters are selected to perform feature extraction on at least part of the second images in one-to-one correspondence.

The first neural network may use various common neural network architectures such as a Convolutional Neural Network (CNN), a Deep Neural Network (DNN), a Recurrent Neural Network (RNN), an Auto-Encoder Neural Network (AENN), a Sparse Autoencoder (SAE) etc., or neural network products such as AlexNet, VGGNet, Google Inception Net, ResNet, etc., which are implemented by the common neural network architectures. Alternatively, a structure of the neural network may also be designed according to the principle of neural networks.

Alternatively, the feature extraction unit 20 is configured to:

select one first machine learning unit to perform feature extraction on one of the plurality of second images, and repeat the process until feature extraction of all the second images is completed.

In some embodiments of the present disclosure, the feature extraction unit 20 comprises a plurality of first machine learning units, and is further configured to:

firstly, train each of the first machine learning units in advance, and select first machine learning units with better performance as candidates required for feature extraction. The performance effect may be measured according to the performance of the machine learning units on a test set, and indexes for evaluation are determined according to specific requirements.

Then, for each of the plurality of second images, one of the above candidate first machine learning units may be randomly selected for feature extraction. Feature extraction may be performed on each of the second images using the same first machine learning unit, or using different first machine learning units.

In some embodiments of the present disclosure, in the feature extraction process, the feature extraction unit 20 is configured to output feature maps having the same resolution of each of the second images. For example, by taking the first machine learning unit being implemented by the first neural network as an example, the feature maps having the same resolution corresponding to each of the second images are output through at least one intermediate layer of the first neural network of the selected first machine learning unit.

For example, for a dermascope image, an Inception v3 neural network is selected according to image features of the dermascope image to perform feature extraction on five second images obtained by transforming the dermascope image through the Inception v3 neural network. Each of the second images is input to an Inception v3 model. As an intermediate layer of the model can extract not only 768 17*17 feature maps, but also 1280 8*8 feature maps, according to the features of the dermascope image needed to be extracted, feature maps are selected, for example, 1280 feature maps with a resolution of 8*8 are selected to be extracted and a total of 5*1280 feature maps are extracted.

For example, for the five second images obtained by transforming the dermascope image, feature extraction is performed on second images which are grayed and binarized through the Inception v3 neural network, and feature extraction is performed on second images which are rotated, stretched and flipped through an Inception-ResNet-v2 neural network. Different intermediate layers of the two neural networks are selected respectively to output 768 17*17 feature maps, and a total of 5*768 feature maps are extracted.

It can be understood by those skilled in the art that, based on the rapid development of the deep learning neural network and the rapid growth of the hardware computing capability, the feature extraction unit 20 may further be configured to output a part of feature maps of the second images with different resolutions, for example, a resolution of a part of the feature maps is 8*8, a resolution of a part of the feature maps is 16*16, and a resolution of a part of the feature maps is 32*32.

In the embodiments described above, suitable extraction is performed by the first machine learning unit on the feature maps of the second images obtained by transforming the first image, which improves the robustness and fault tolerance of the image processing process. At the same time, a suitable first machine learning unit and a resolution of the feature images output by the first machine learning unit are selected according to the requirements, which effectively optimizes the speed, accuracy, and stability of image processing.

The image processing unit 30 comprises a second machine learning unit and is configured to input all the plurality of feature maps of each of the second images to the second machine learning unit to obtain the processing result of the first image.

In the embodiment of the present disclosure, the image processing unit 30 is configured to input all the feature maps obtained by the feature extraction unit 20 to the second machine learning unit for processing, and the processing may be one or more image processing processes such as image analysis, segmentation, recognition, classification, clustering, retrieval, etc. The second machine learning unit may be any algorithm or model for merging the feature maps, such as support vector machine, simple fusion, collaborative training fusion, neural network, etc.

In some embodiments of the present disclosure, in the image processing unit 30, an object processed by the second machine learning unit is all the obtained feature maps, and pixels, sizes, or numbers of the feature maps may be the same or different. The second machine learning unit may process all the feature maps by merging them together to obtain and output the final processing result.

In some embodiments of the present disclosure, the second machine learning unit comprises a second neural network such as a neural network known in the related art or a neural network having new parameters or formed with a new architecture which is generated by training the known neural network.

In some embodiments of the present disclosure, the second machine learning unit may use one of the first machine learning units, and a new structure may be designed, built and trained according to the requirements of the image processing to be completed.

For example, in some embodiments of the present disclosure, by taking the second machine learning unit being the second neural network as an example, a structure of the second neural network may be designed as a convolutional layer—a fully connected layer—an LR classifier to classify the first image, or may also be designed as a convolutional layer-a pooling layer-a fully connected layer—an SVM classifier to classify the first image, or may also be designed as a convolutional layer—a pooling layer—K-means clustering to cluster the first image, or may also be designed as a convolutional layer—a fully connected layer—a deconvolutional layer to enhance a resolution of the first image, and so on. The structure of the second neural network may be specifically designed according to the requirements of the image processing purposes.

In the embodiments described above, the second machine learning unit in the image processing unit 30 processes the plurality of feature maps output by the feature extraction unit, which enhances the accuracy and robustness of the image processing.

It should be illustrated that, although the above description does not specifically describe a connection relationship among the image transformation unit, the feature extraction unit, and the image processing unit, it can be understood by those skilled in the art based on the technical solutions described In the embodiments described above that the image transformation unit is in communicative connection with the feature extraction unit, and the feature extraction unit is in communicative connection with the image processing unit.

In some embodiments of the present disclosure, there is further provided an image processing device, including: one or more processors; one or more memories having instructions stored thereon, which when executed on the one or more processors, cause the one or more processors to be configured to perform the image processing methods according to the above embodiments.

Figure 5:
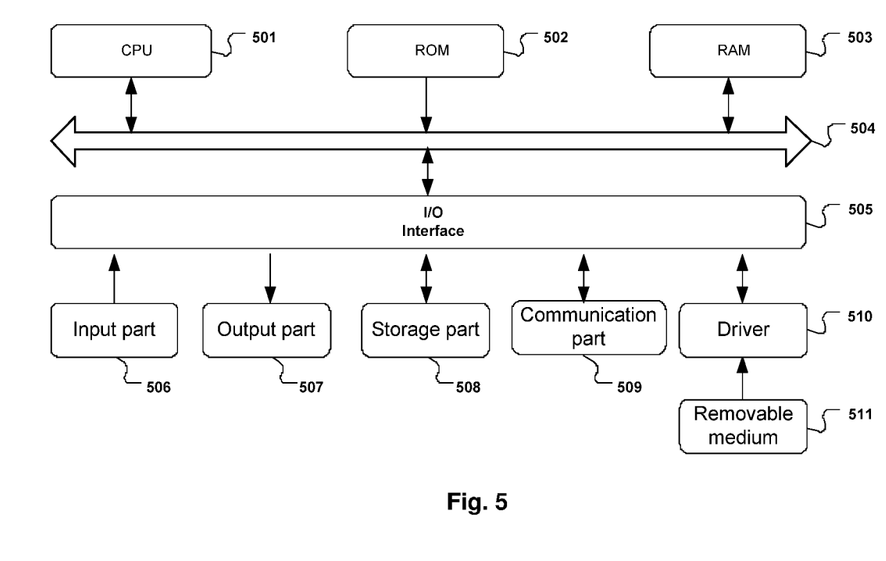
FIG. 5 shows a schematic structural diagram of an image processing device for implementing the image processing method according to at least one embodiment of the present disclosure.

In some embodiments of the present disclosure, as shown in FIG. 5, an implementation of the image processing device is provided in terms of structure. The computer image processing device 500 comprises a Central Processing Unit (CPU) 501 which may execute various appropriate actions and processes according to programs stored in a Read Only Memory (ROM) 502 or programs loaded from a storage part 508 into a Random Access Memory (RAM) 503. In the RAM 503, various programs and data required for the operation of the device 500 are also stored. The CPU 501, the ROM 502, and the RAM 503 are connected to each other via a bus 504. An Input/Output (I/O) interface 505 is also connected to the bus 504.

The following components are connected to the I/O interface 505: an input part 506 including a keyboard, a mouse, etc.; an output part 507 including a Cathode Ray Tube (CRT), a Liquid Crystal Display (LCD), a speaker etc.; a storage part 508 including a hard disk etc., and a communication part 509 including a network interface card such as an LAN card, a modem, etc. The communication part 509 performs communication processing via a network such as the Internet. The driver 510 is also connected to the I/O interface 505 as needed. A removable medium 511 such as a magnetic disk, an optical disk, a magneto-optical disk, a semiconductor memory, etc. is mounted on the driver 510 as needed so that computer programs read therefrom can be installed into the storage part 508 as needed.

In particular, according to the embodiments of the present disclosure, the processes described above with reference to FIG. 1 may be implemented as computer software programs. For example, the embodiments of the present disclosure comprise a computer program product. The computer program product comprises computer programs which are tangibly embodied on a machine-readable medium. The computer programs comprise program codes for performing the method of FIG. 1. In such an embodiment, the computer programs may be downloaded and installed from the network via the communication part 509, and/or may be installed from the removable medium 511.

The flowcharts and block diagrams in the drawings illustrate the architecture, functions, and operations of possible implementations of systems, methods, and computer program products according to various embodiments of the present disclosure. In this regard, each block in the flowcharts or block diagrams may represent a unit, a program section, or a part of a code, which comprises one or more executable instructions for implementing specified logical functions. It should also be noted that in some implementations as an alternative, the functions illustrated in the blocks may also occur in an order different from that illustrated in the drawings. For example, two blocks which are illustrated as being connected may actually be executed substantially in parallel, or may sometimes be executed in a reverse order, depending on the functions involved. It should also be noted that each block in the block diagrams and/or flowcharts, and combinations of blocks in the block diagrams and/or flowcharts, may be implemented by hardware-based special purpose systems which perform the specified functions or operations, or may be implemented using a combination of dedicated hardware and computer instructions.

A unit or units described in the embodiments of the present disclosure may be implemented by software, or may also be implemented by hardware. The described unit or units may also be provided in the processor. Names of the unit or units do not constitute a limitation on the unit or units in a certain case.

In some embodiments, there is further provided a computer-readable storage medium. The computer-readable storage medium may be a computer-readable storage medium included in the computer product described in the embodiments described above; or may also be a separate computer-readable storage medium which is not assembled into a computer product. The provided computer-readable storage medium stores computer instructions executed by a processor which when executed by the processor, can perform the image processing method according to various embodiments of the present disclosure.

The above description is merely preferred embodiments of the present disclosure and descriptions of applied technical principles. It should be understood by those skilled in the art that the scope involved in the present disclosure is not limited to the technical solutions formed by specifically combining the above technical features, but should also cover other technical solutions formed by randomly combining the above features and equivalents thereof without departing from the concept, for example, technical solutions formed by interchanging the above-described features with technical features having similar functions which are disclosed in the present disclosure (the present disclosure is not limited thereto).

We claim:

1. A method of processing a dermoscope image, comprising:
    transforming a first dermoscope image to obtain two or more second dermoscope images for the first dermoscope image;
    performing feature extraction on the two or more second dermoscope images by using a first machine learning unit selected from a group of first machine learning units, and obtaining a feature map of each of the two or more second dermoscope images; and
    inputting the feature map of each of the two or more second dermoscope images to a second machine learning unit to obtain a processing result of the first dermoscope image,
    wherein the obtaining a feature map of each of the two or more second dermoscope images comprises: outputting feature maps having a same resolution of each of the two or more second dermoscope images,
    wherein the first machine learning unit comprises a first neural network, and the method further comprises:
    outputting the feature maps having the same resolution of each of the two or more second dermoscope images through at least one intermediate layer of the first neural network of the selected first machine learning unit,
    wherein the first neural network comprises an Inception v3 neural network or an Inception-ResNet-v2 neural network,
    wherein the outputting the feature maps having the same resolution of each of the two or more second dermoscope images through at least one intermediate layer of the first neural network of the selected first machine learning unit comprises:
    outputting the feature maps having the same resolution of each of the two or more second dermoscope images through at least one intermediate layer of the Inception v3 neural network or the Inception-ResNet-v2 neural network of the selected first machine learning unit.

2. The method according to claim 1, wherein the obtaining a feature map of each of the two or more second dermoscope images comprises:
    selecting one first machine learning unit from the group of first machine learning units, to perform feature extraction on each of the two or more second dermoscope images.

3. The method according to claim 1, wherein the obtaining a feature map of each of the two or more second dermoscope images comprises:
    selecting a plurality of first machine learning units from the group of first machine learning units, to perform feature extraction on at least some of the two or more second dermoscope images in one-to-one correspondence.

4. The method according to claim 1, wherein the second machine learning unit comprises a second neural network,
    wherein the inputting the feature map of each of the two or more second dermoscope images to a second machine learning unit to obtain a processing result of the first dermoscope image comprises:
inputting the feature map of each of the two or more second dermoscope images to the second neural network, and classifying or clustering the first dermoscope image by using the second neural network, so as to obtain a processing result of the first dermoscope image.

5. The method according to claim 1, wherein the transforming a first dermoscope image to obtain two or more second dermoscope images for the first dermoscope image comprises:
transforming the first dermoscope image according to a transformation rule to obtain two or more second dermoscope images for the first dermoscope image.

6. The method according to claim 5, wherein the transformation rule comprises at least one of:
rotating the first dermoscopic image;
transforming the first dermoscopic image based on a color constancy theory;
flipping the first dermoscopic image; and
graying the first dermatoscope image.

7. The method according to claim 5, wherein the first dermoscopic image comprises a melanoma image, and the transforming a first dermoscopic image comprises:
performing transformation without changing pathological properties of the melanoma image.

8. A device of processing a dermoscope image, comprising:
one or more processors;
one or more memories connected to the one or more processors and having instructions stored thereon which, when executed on the one or more processors, cause the one or more processors to be configured to:
transform a first dermoscope image to obtain two or more second dermoscope images for the first dermoscope image;
perform feature extraction on the two or more second dermoscope images by using a first machine learning unit selected from a group of first machine learning units, so as to obtain a feature map of each of the two or more second dermoscope images; and
input the feature map of each of the two or more second dermoscope images to a second machine learning unit to obtain a processing result of the first dermoscope image,
wherein the one or more processors are further configured to obtain feature maps having a same resolution of each of the two or more second dermoscope images,
wherein the first machine learning unit comprises a first neural network,
wherein the first neural network comprises at least one of an Inception v3 neural network and an Inception-ResNet-v2 neural network, and
wherein the one or more processors are further configured to output the feature maps having the same resolution of each of the two or more second dermoscope images through at least one intermediate layer of the Inception v3 neural network or the Inception-ResNet-v2 neural network of the selected first machine learning unit.

9. The device according to claim 8, wherein the one or more processors are further configured to select one first machine learning unit from the group of first machine learning units, to perform feature extraction on each of the two or more second dermoscope images.

10. The device according to claim 8, wherein the one or more processors are further configured to select a plurality of first machine learning units from the group of first machine learning units, to perform feature extraction on at least some of the two or more second dermoscope images in one-to-one correspondence.

11. The device according to claim 8, wherein the second machine learning unit comprises a second neural network, and
wherein the one or more processors are further configured to input the feature map of each of the two or more second dermoscope images to the second neural network, and classify or cluster the first dermoscope image by using the second neural network, so as to obtain a processing result of the first dermoscope image.

12. The device according to claim 8, wherein the one or more processors are further configured to transform the first dermoscope image according to a transformation rule to obtain two or more second dermoscope images for the first dermoscope image, and
wherein the transformation rule comprises at least one of:
rotating the first dermoscopic image;
transforming the first dermoscopic image based on a color constancy theory;
flipping the first dermoscopic image; and
graying the first dermatoscope image.

13. The device according to claim 12, wherein the first dermoscopic image comprises a melanoma image, and transforming a first dermoscopic image comprises: performing transformation without changing pathological properties of the melanoma image.

14. A method of processing a dermoscope image, comprising:
transforming a first dermoscope image to obtain two or more second dermoscope images for the first dermoscope image;
performing feature extraction on the two or more second dermoscope images by using a first machine learning unit selected from a group of first machine learning units, and obtaining a feature map of each of the two or more second dermoscope images; and
inputting the feature map of each of the two or more second dermoscope images to a second machine learning unit to obtain a processing result of the first dermoscope image,
wherein the obtaining a feature map of each of the two or more second dermoscope images comprises: outputting feature maps having a same resolution of each of the two or more second dermoscope images,
wherein the first machine learning unit comprises a first neural network, and the method further comprises:
outputting the feature maps having the same resolution of each of the two or more second dermoscope images through at least one intermediate layer of the first neural network of the selected first machine learning unit,
wherein the first neural network comprises an Inception v3 neural network or an Inception-ResNet-v2 neural network,
wherein the outputting the feature maps having the same resolution of each of the two or more second dermoscope images through at least one intermediate layer of the first neural network of the selected first machine learning unit comprises:
outputting the feature maps having the same resolution of each of the two or more second dermoscope images through at least one intermediate layer of the Inception v3 neural network or the Inception-ResNet-v2 neural network of the selected first machine learning unit, or wherein the first neural network comprises an Inception v3 neural network and an Inception-ResNet-v2 neural network, wherein the outputting the feature maps having the same resolution of each of the two or more second dermoscope images through at least one intermediate layer of the first neural network of the selected first machine learning unit comprises:

outputting the feature maps having the same resolution of at least one of the two or more second dermoscope images through at least one intermediate layer of the Inception v3 neural network of the selected first machine learning unit, and outputting the feature maps having the same resolution of at least another one of the two or more second dermoscope images through at least one intermediate layer of the Inception-ResNet-v2 neural network of the selected first machine learning unit.

* * * * *